Dec. 23, 1952     A. J. BUTTERWORTH     2,622,574
VALVE GEAR FOR INTERNAL-COMBUSTION ENGINES
Filed Feb. 21, 1952     4 Sheets-Sheet 2
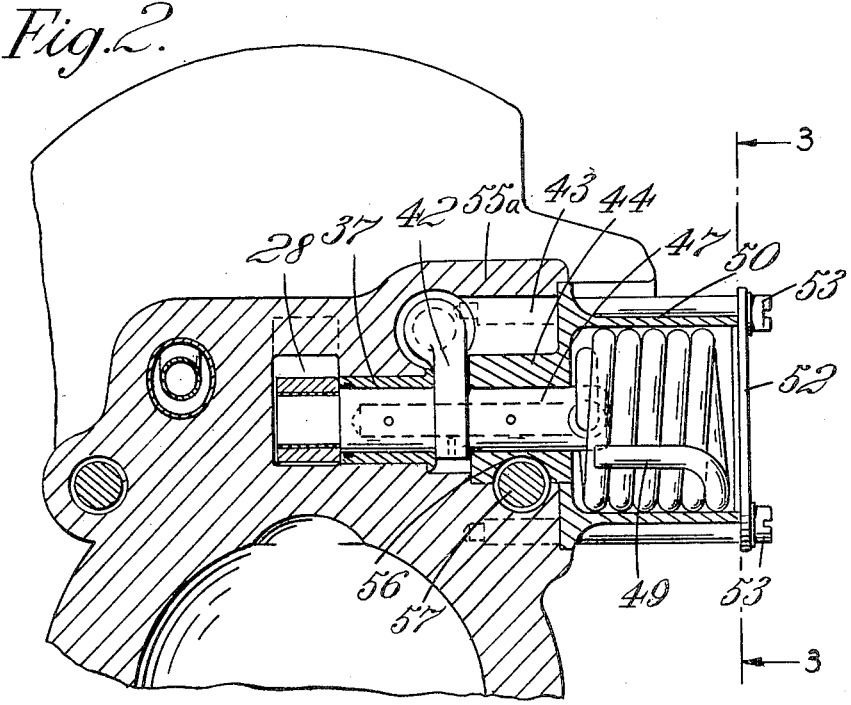
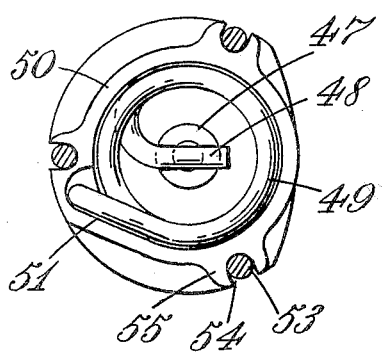
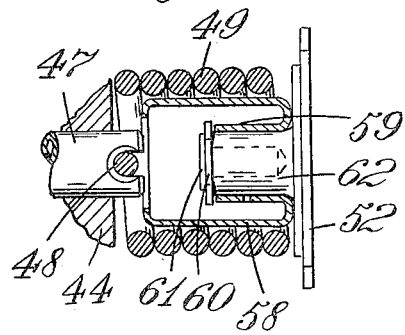
Inventor
Archibald J. Butterworth
By Young, Emery & Thompson
Attys.

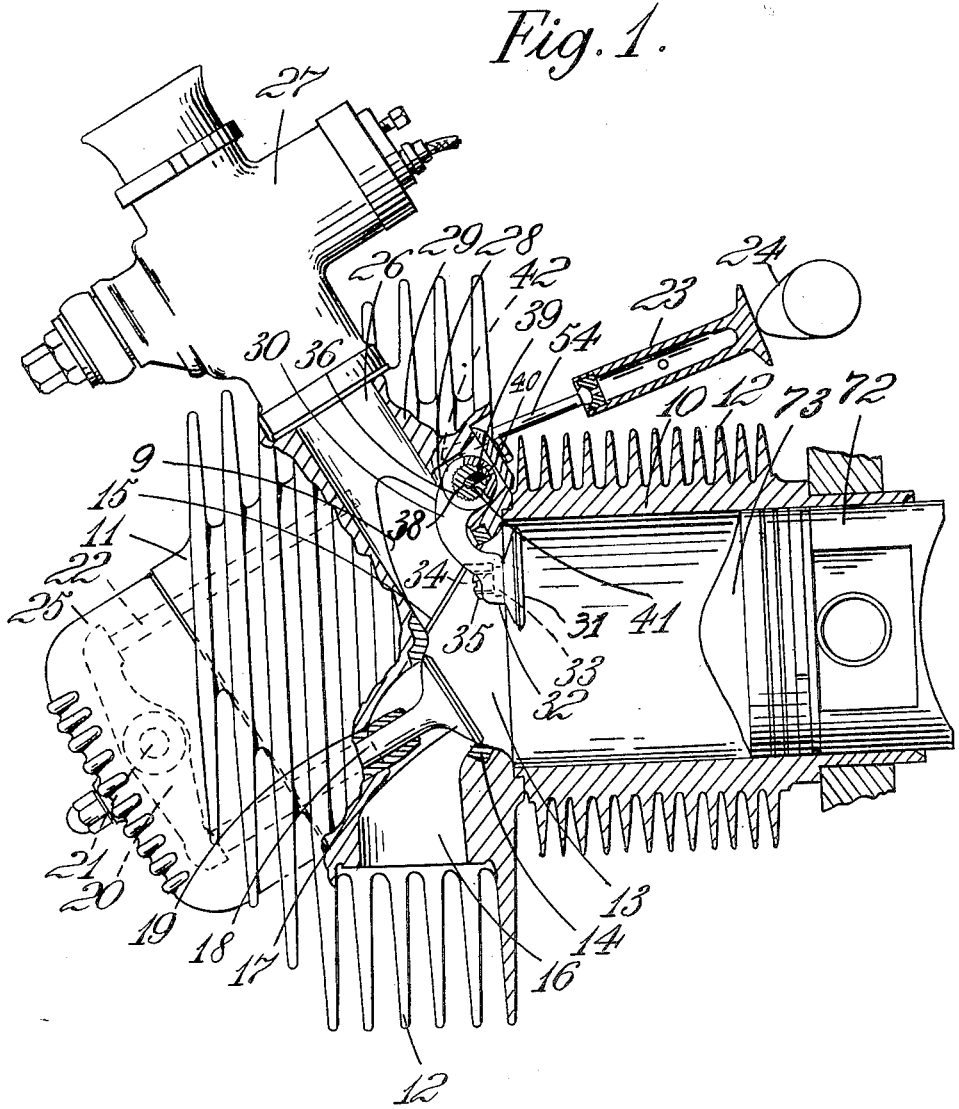

Inventor
Archibald J. Butterworth
By Young, Emery & Thompson Attys

Dec. 23, 1952  A. J. BUTTERWORTH  2,622,574
VALVE GEAR FOR INTERNAL-COMBUSTION ENGINES
Filed Feb. 21, 1952  4 Sheets-Sheet 4

Inventor
Archibald J. Butterworth
By Young, Emery & Thompson
Attys.

Patented Dec. 23, 1952

2,622,574

UNITED STATES PATENT OFFICE 2,622,574

VALVE GEAR FOR INTERNAL-COMBUSTION ENGINES

Archibald James Butterworth, Frimley, England

Application February 21, 1952, Serial No. 272,804

In Great Britain September 6, 1949

22 Claims. (Cl. 123—90)

This invention relates to a valve gear for an internal combustion engine, particularly for use in a racing or similar high efficiency type of automobile or for use in piston aero engines. In high-speed, high efficiency type internal combustion engine, such as an unsupercharged racing engine, power output is commonly limited by the difficulty of filling the cylinder at high rates of engine revolution. The root of this problem lies in the comparatively poor efficiency of the orifice created by an open poppet valve particularly in dealing with an intermittent flow.

At high speeds the momentum of each charge of gas is a dominating factor and any deviation from the straight line flow or any rapid variation in cross sectional area of the inlet passage results in a serious loss of power.

Devices such as rotary valves, sleeve valves and the like in many cases give excellent straight through passages thereby increasing volumetric efficiency but they introduce various mechanical and production problems apart from the difficulty of sealing and cooling them during the power stroke.

The object of the present invention is to provide a straight constant area passage for the entering combustible charge (or for the exhaust gases) while retaining the proved reliability and mechanical simplicity of the poppet valve head and its excellent gas sealing properties.

A further object of the invention is to provide a mounting for the valve head which will enable it to be swung away from the valve seat to one side thereof thereby leaving an unobstructed flow.

A still further object of the invention is to provide such a swinging mounting which will enable the head to rotate about its own axis so as to facilitate grinding in and also so as to enable it to be self-seating on the valve seat.

Figure 5:
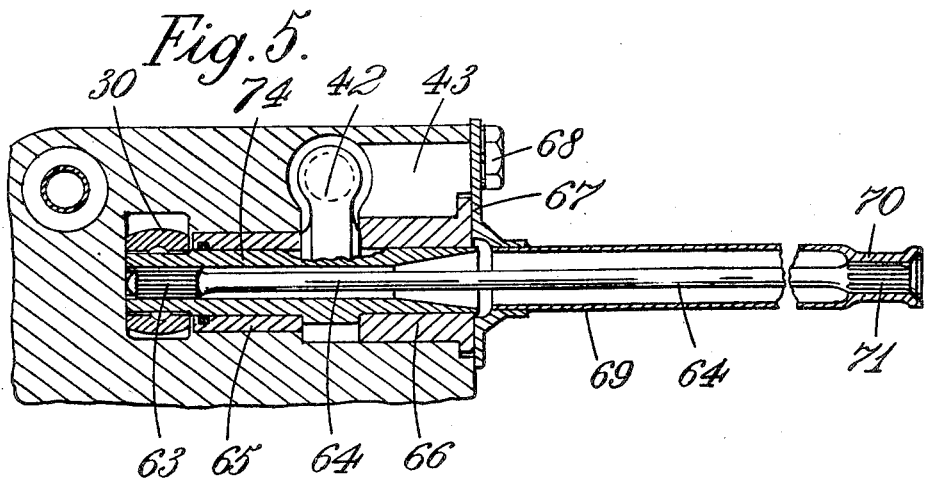
Figure 6:
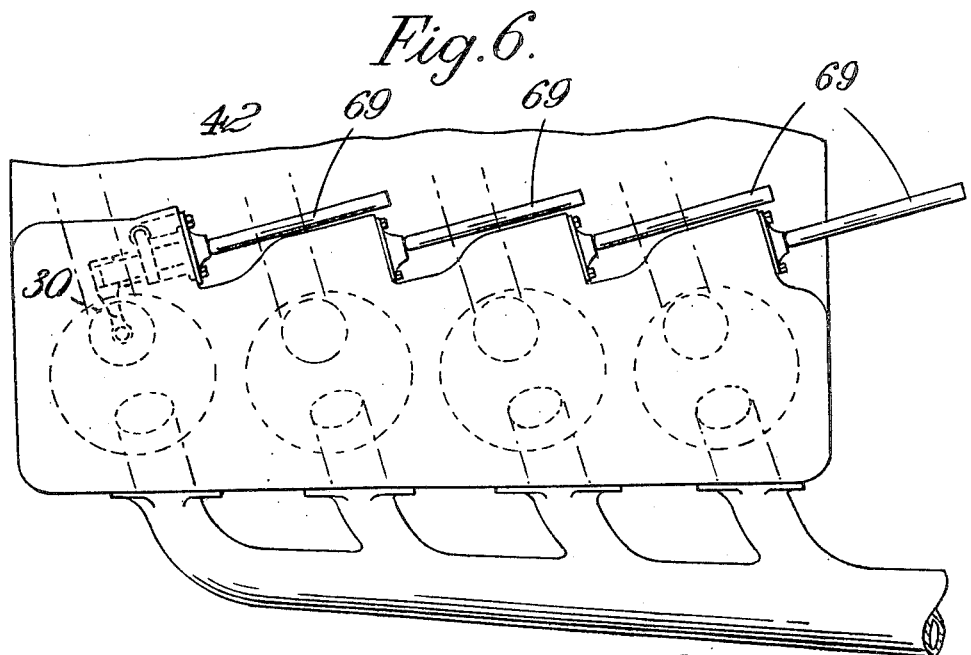
Figure 7:
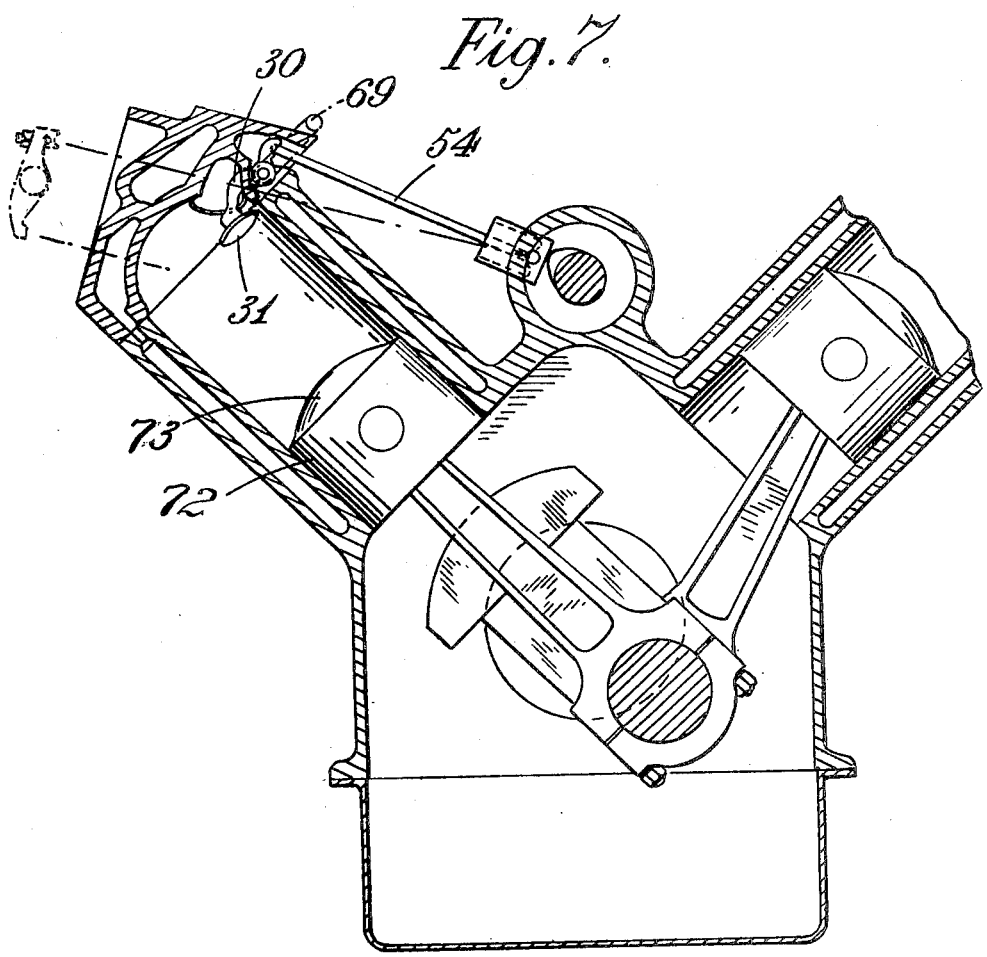

The following is a description of a racing car engine constructed according to the invention, reference being made to the accompanying drawings in which:

Figure 1 is a part section along the axis of the engine cylinder, and a part section and part elevation of the cylinder head, Figure 2 is a section along the axis of rotation of the rocker shaft for the inlet valve, Fig. 3 is a sectional view taken on line 3—3 of Fig. 2, Fig. 4 is an axial fragmentary sectional view of the spring and its associated mechanism for preventing surging of the spring, Fig. 5 is an axial sectional view of a modified form of rocker shaft and spring, Fig. 6 is a fragmentary plan view of an engine having cylinders cast in line and equipped with rocker shaft and spring construction of Fig. 5, Fig. 7 is a sectional view taken on a plane perpendicular to the crank shaft of the engine of Fig. 6.

The engine is air cooled and the cylinder 10 and the cylinder head 11 are provided with cooling fins 12 for that purpose. The cylinder head is provided with a spherical or penthouse shaped combustion chamber and is also provided with an exhaust valve seating 14 and with an inlet valve seating 15. The exhaust valve seating is arranged at the end of a curved exhaust passage 16 with which is associated an exhaust manifold or pipe (not shown). A conventional poppet valve 17 is associated with the exhaust valve seat 14, and the valve is provided with a stem 18 which passes up through a valve guide 19 in the cylinder head, inclined to the cylinder axis which valve stem, is engaged by one end of a rocker 20 pivotally mounted at 21 on the outside of the cylinder head, the other end of the rocker 20 engages a push-rod 22, which extends downwardly through a passage formed in the cylinder head and is operated by a tappet similar to the tappet 23 provided for operating the inlet valve, both of which tappets are actuated by a cam shaft 24. The rocker mechanism 20, 21 is enclosed in conventional manner beneath the valve casing 25. So far, the mechanism is conventional.

A straight inlet passage 26 of circular cross section is formed in the cylinder head, and its outer end communicates directly with a carburettor 27. The inner end of the passage 26 is provided with the aforesaid inlet valve seat 15, the plane of which, it will be noted, is oblique to the axis of the passage 26. The contour of the inlet valve seat will be larger than that of the passage and since it also requires to be circular, the cross-sectional area of the passage gradually increases towards the inlet valve seat, as indicated by the lines 9. A recess 28 is formed in the wall 29 of the inlet passage 26 adjacent the valve seat 15, and located in this recess is one end of a rocker arm 30, to the other end of which is secured a poppet valve head 31. This latter end of the rocker arm is provided with a bearing 32 through which extends a stem 33 on the valve head. The stem is provided with a reduced screw-threaded extension 34 which is engaged by a nut 35, which is located in a recess formed in the end of the rocker arm. The length of the larger diameter portion of the stem is slightly greater than the length of the bearing so that the shoulder projects above the bottom of the recess, say by about one thousandth of an inch so that the head of the valve can rotate thereby facilitating grinding in. The bottom of the recess may be part spherical and the underside of the nut likewise part spherical, and the stem may be an easy fit in the bearing so that a very small degree of rocking movement of the head is permitted, thereby rendering it self-seating. In an alternative arrangement, the stem on the valve head may be of constant cross-section and extends through a straight bore in the rocker which bore is of such a size as to permit a degree of self-aligning movement of the head, the end of the stem being riveted over so as to permit that movement.

In yet a simpler construction, the valve head may be formed integrally with the rocker.

The end of the rocker within the recess is provided with a serrated hole 36, a bearing 37 is arranged in the wall of the passage to one side of the recess 28, and one end 38 of the rocker shaft 47 projects through this bearing and is provided with a serrated extremity which engages the serrated hole 36 in the rocker arm. Axial displacement between these two parts may be prevented by a pin 39 which extends through a radial hole in the rocker shaft and engages a recess 40 in the bore of the rocker arm. The pin may be maintained in engagement by a spring 41. The rocker shaft 47 is provided intermediate of its ends with an operating arm 42, which in assembling is passed through a slot 43 in a housing 55 on the outside of the wall of the passage 26. The bottom of the housing is provided with a hole through which an adjustable push-rod 54 extends, the lower end of which push-rod engages the aforesaid cam operated tappet 23. After the end of the rocker shaft 30 has been inserted into the bearing 37, a removable bearing or bushing 44 is inserted into the housing.

It will be seen that with the inlet valve open, a full, straight opening is provided for the entering gas and that the small obstruction presented by the rocker arm 30 in this position may readily be made of streamline form and the small reduction in area compensated by blending the inlet passage gradually as indicated by the line 9 into the elliptic section presented by the valve when viewed along the port axis.

By suitably proportioning, the valve head 31 and the port 15, this gradual increase of area can be utilised as a diffuser to recover a proportion of the velocity head of the moving column of charge and raise the static pressure of the charge at the end of inspiration. Suitable proportions of the last few inches of the inlet port would be such as to give an increase in area towards the valve corresponding to that in a normal circular diffuser cone of 5° to 7° angle of taper. Allowance must be made for the reduction of area by the presence of the rocker arm 30 as mentioned above.

The end of the rocker shaft 47 is slotted and is engaged by one end 48 of a helical spring 49 which is encircled by a casing 50 formed integrally with the aforesaid bushing 44. The other end of the helical spring 49 is bent so as to extend along the outside of the spring and is accommodated in a slot 51 formed in the side wall of the casing 50. The casing may be provided with a cover plate 52 extending beyond the periphery of the casing and drilled or slotted to receive a number of screws 53 which also pass through slots 54 formed in radially extending lugs 55 at the base of the casing. The screws are arranged to engage threaded holes in the housing 55a. With this arrangement after the bearing 44 has been inserted into the housing and before the screws 53 are inserted the casing 50 may be rotated so as initially to load the helical spring and after the slotted lugs have been brought into register with the holes in the housing the screws are inserted.

The bushing 44 is provided with a tangentially extending groove 56 in order to permit the passage of cylinder holding down stud 57.

In order to prevent surging of the helical spring 49 when subjected to high speed torsional oscillations it is arranged (as seen in Figure 4) to encircle a tubular element 58 having an internal axially extending portion 59 rotatably mounted on a spindle projecting from the inner side of the cover 52. The tubular element is retained on the spindle by a washer 60 and the head of the spindle. The diameter of the tube is so selected in relation to the internal diameter of the coils of the spring that normally there is clearance between these parts but should any coil of the spring be wound by beyond that permitted by safe stress condition, then the overstressed coil grips the tube which then rotates with it.

The arrangement as described so far shows the axis of the rocker shaft, and valve socket to lie parallel to the crankshaft and camshaft axes. This arrangement is convenient for engines having separate cylinders and cylinder heads, but where several cylinders are cast in line as a "monobloc" this would present machining and assembly difficulties.

In such engines, the arrangement shown in Figures 5, 6 and 7 is to be preferred. Here the rocker-shafts lie at such an angle to the crank axis (and to the plane containing the cylinder axes) as to permit machining of the housings, and assembly of bearing and spring details, without fouling adjacent cylinders. Such a disposition of the rocker shaft also permits the convenient use of straight torsion bar springs, which are to be preferred on account of their very high natural frequency of torsional vibration and consequent freedom from surge.

In such a construction a tubular rocker shaft 74 is employed having the aforesaid operating arm 42 formed integrally therewith. The tubular rocker shaft is internally and externally serrated at one end, the external serrations being engaged by the serrations in the bore at the end of the rocker 30. The internal serrations are engaged by serrations on an enlarged end 63 of a torsion bar 64 which extends through the bore in the hollow rocker shaft. The hollow rocker shaft is rotatably mounted in bearings 65 and 66 disposed on either side of the operating arm 42 within the housing 43. The bearing 66 is flanged and is retained in position by a cover plate 67 secured in position by screws 68. The cover plate has rigidly secured to it a torque resisting tube 69 having a reduced end 70 which is internally serrated and engages a serrated enlargement 71 at the end of the torsion bar 64. The general disposition of the various torsion resisting tubes 69 is best seen in Figure 6.

In either of the arrangements referred to above the piston 72 in the cylinder is provided with a convexly shaped crown 73 which is so shaped that the inlet valve may partly open at the commencement of the induction stroke. The valve gear thus described is repeated for each cylinder.

It will be appreciated with either of the arrangements referred to above, the weight of the oscillating parts of the valve gear may be maintained comparatively small.

I claim:

1. Valve gear for an internal combustion engine comprising a passage leading to a valve seat opening into the combustion space of the engine, a poppet valve head, a mounting for the poppet valve head constraining it to swing about an axis extending transversely to the axis of the head at a distance therefrom, whereby the head may be moved from a position where it contacts with the seat to a position where the general plane of the head is at an angle to the plane of the valve seat.

2. Valve gear for an internal combustion engine according to claim 1, and in which the valve seat is arranged at the end of the passage where the passage joins the cylinder, and the mounting for the poppet valve head is arranged to constrain the valve head to move from the position where it contacts with the seat to a position in which it lies within the combustion space at the end of the cylinder at one side of the valve seat.

3. Valve gear for an internal combustion engine according to claim 1, and in which the valve seat is arranged at the end of the passage where it joins the cylinder and the mounting for the poppet valve is arranged to constrain the valve head to move from a position where it contacts with the seat to a position in which it lies within the cylinder space to one side of the valve seat.

4. Valve gear for an internal combustion engine according to claim 1, and in which said passage has a straight longitudinal axis and the plane of the valve seat is arranged oblique to said axis, and the cross sectional area of which passage gradually changes from a smaller circle to the larger circle bounding the area of the oblique valve seat.

5. Valve gear according to claim 1, and in which the valve head is secured at one end to an arm the other end of which is secured to a rocker shaft mounted in a bearing to one side of the passage so that the shaft is clear of the passage and which arm extends through a recess in the wall of the passage, and which rocker shaft is provided with an operating arm to one side of said bearing.

6. A valve gear according to claim 1, and comprising a recess formed in the wall of the passage adjacent the valve seat, a rocker arm, one end of which is secured to said valve head, the other end of which rocker arm is located in said recess and is provided with a hole which registers with a bearing on one side of the recess, the axis of which hole and bearing is transverse to the axis of the passage and to the axis of the valve head, a rocker shaft extending through said hole and means for securing the rocker shaft to said rocker arm, and an operating arm attached to said rocker shaft outside said bearing.

7. A valve gear according to claim 1 comprising a recess formed in the wall of the passage adjacent the valve seat, a rocker arm to one end of which is secured said valve head, and the other end of which arm is located in said recess, and is provided with a serrated hole which registers with a bearing in a side wall in said recess, the axis of which hole and bearing is transverse to the axis of the passage and to the axis of the valve head, a rocker shaft extending through said bearing and having a serrated end which engages the serrated hole in the rocker arm, means for securing the rocker against axial displacement on the rocker shaft and an operating arm attached to said rocker shaft outside said bearing.

8. A valve gear according to claim 1, and comprising a recess formed in the wall of the passage adjacent the valve seat, a rocker arm to one end of which is secured said valve head, the other end of which arm is located in said recess, and is provided with a hole which is co-axial with a bearing in a wall flanking said recess, a rocker shaft having an operating arm intermediate of its ends, one of which ends is arranged to extend through said bearing and the hole in said rocker arm, means for securing that end to the rocker arm, the other end of which rocker shaft is disposed in a slotted housing in said wall of the passage and through which slot an operating arm is inserted during assemblage, a bearing in said slotted housing engaging the latter end of the rocker shaft, and which latter end projects beyond the bearing, a helical spring having one end attached to said projecting end of the rocker shaft and the other end of which spring is fixed to the housing.

9. A valve gear according to claim 1 and comprising a recess formed in the wall of the passage adjacent the valve seat, a rocker arm to one end of which is secured said valve head, the other end of which arm is located in said recess, and is provided with a hole which lies co-axially with a bearing in a wall flanking said recess, a rocker shaft having an operating arm intermediate of its ends one of which ends is arranged to extend through said bearing and the hole in said rocker arm, means for securing that end to the rocker arm, the other end of which rocker shaft is disposed in a slotted housing in said wall of the passage and through which slot the operating arm is inserted during assemblage on an outer bearing in said slotted housing engaging the latter end of the rocker shaft, and which latter end projects beyond the bearing, a spring housing enclosing the projecting end, and rotatably adjustable in relation to the rocker shaft, a helical spring within the spring housing having one end connected to the projecting end of the rocker shaft, and the other end of which spring is attached to the spring housing and means for securing the spring housing in its adjusted position.

10. A valve gear according to claim 9 and in which the spring housing is formed integrally with said outer bearing which is rotatably adjustable on the slotted housing.

11. A valve gear according to claim 1 and comprising a mounting for said valve head having a bearing which permits the head to rotate about the axis of the head.

12. A valve gear according to claim 1 and comprising a mounting for the valve head having a bearing adapted to permit the valve head to rotate about its axis and to permit a limited amount of swinging movement so as to render the valve head self-seating.

13. A valve gear according to claim 1 and comprising a mounting for the valve head having a bearing, a stem on said valve head which stem is of greater length than said bearing, a reduced threaded portion on said stem adapted to provide a shoulder spaced a short distance beyond the end of the bearing, and a nut engaging said threaded portion whereby the head is adapted to rotate in said bearing.

14. An internal combustion engine having at least the inlet port arranged in a cylinder head over the cylinder, a passage leading to that port having a valve seat arranged at the end of the passage where it joins the cylinder, a poppet valve head, a mounting for the poppet valve constraining it to swing about an axis disposed transversely to the axis of the head and at a distance therefrom whereby the head may be moved from a position where it contacts with the seat to a position in which it lies within the combustion head at the end of the cylinder to one end of the valve seat, a piston in said cylinder having a crown so convexly shaped that at outer dead centre it may project into the combustion space but so as to be clear of said inlet valve at the commencement of the induction stroke.

15. An internal combustion engine comprising a cylinder, a cylinder head formed with a combustion space and at least the inlet valve disposed over the cylinder, a straight passage formed in the cylinder head leading to said inlet valve seat, a carburettor attached directly to the outer end of the straight passage, a poppet valve head, a mounting for the poppet valve head constrained to swing about an axis disposed transversely to the axis of said straight passage and to one side thereof, whereby the head may be moved from a position where it contacts with the seat to a position in which it lies within the cylinder.

16. An internal combustion engine comprising an engine cylinder, a cylinder head secured to said cylinder, and formed with a combustion space containing both an inlet valve seat and an exhaust valve seat, a rocker mechanism mounted on the outer side of the cylinder head and engaging an exhaust valve stem, and having a push rod, associated with the rocker gear extending down through said head and operated by cam mechanism on the underside of the head to one side of the cylinder, an inlet passage formed in said cylinder head, a valve seat associated with the passage, a poppet valve head, a mounting for the poppet valve constraining it to swing about an axis disposed transversely to the axis of the head and to the axis of the passage, and to one side thereof, a rocker arm to one end of which the valve head is secured, the other end of which rocker arm is secured to a rocker shaft mounted in a bearing to one side of the passage, and transverse to the longitudinal axis of said passage, and which arm extends into the passage, an operating arm on said rocker shaft, an adjustable push rod associated with said operating arm and actuated by the aforesaid cam mechanism.

17. A valve gear for an internal combustion engine, a passage leading to the engine cylinder, a housing in a wall of said passage, the axis of which housing is transverse to that of the passage and which passage and housing have an aperture extending between them a rocker shaft rotatably mounted in the housing, a rocker arm at the end of said rocker shaft and extending through said aperture into the passage, a poppet valve head on said rocker arm, and a valve seat associated with said passage and engageable by the valve head, an operating lever on the rocker shaft, which rocker shaft projects from said housing and spring means connected between said projecting end and a fixed part of the mechanism.

18. A valve gear according to claim 17 wherein the axis of said housing and rocker shaft is parallel with the cam shaft of the internal combustion engine.

19. A valve gear according to claim 17 wherein the axis of said housing and rocker shaft is inclined to the crank shaft of the internal combustion engine, as viewed along the axis of the engine cylinder.

20. A valve gear according to claim 17 wherein the spring means comprises a torsion bar connected at one end to said rocker shaft and at the other end to a fixed part of the mechanism.

21. A valve gear according to claim 17 wherein the axis of said housing and rocker shaft is inclined to the crank shaft of the internal combustion engine as viewed along the axes of the engine cylinder and said spring means comprise a torsion bar arranged co-axially with the rocker shaft and having one end connected thereto, and the other connected to a fixed part of the mechanism.

22. A valve gear for an internal combustion engine comprising a passage leading to the engine cylinder, a housing in the wall of said passage, the axis of which housing is transverse to that of the passage, and which housing and passage have an aperture extending between them, a tubular rocker shaft rotatably mounted in said housing, a rocker arm at one end of the rocker shaft extending through said aperture into said passage, a poppet valve head on said rocker arm, a valve seat associated with said passage and engageable by the valve head, an operating lever on the tubular rocker shaft extending into a slot in said housing, a torsion bar extending into the tubular rocker shaft and connected to that end thereof which carries the rocker arm, the other end of which torsion bar projects from the other end of the tubular rocker shaft, a torsion resisting tube connected at one end to the torsion bar and at the other end to a fixed part of the mechanism.

ARCHIBALD JAMES BUTTERWORTH.

No references cited.